(12) United States Patent
Waagaard et al.

(10) Patent No.: US 7,480,056 B2
(45) Date of Patent: Jan. 20, 2009

(54) MULTI-PULSE HETERODYNE SUB-CARRIER INTERROGATION OF INTERFEROMETRIC SENSORS

(75) Inventors: Ole Henrik Waagaard, Trondheim (NO); Erlend Ronnekleiv, Trondheim (NO)

(73) Assignee: Optoplan AS, Trondheim (NO)

( * ) Notice: Subject to any disclaimer, the term of this patent is extended or adjusted under 35 U.S.C. 154(b) by 699 days.

(21) Appl. No.: 10/862,123

(22) Filed: Jun. 4, 2004

(65) Prior Publication Data

US 2005/0271395 A1     Dec. 8, 2005

(51) Int. Cl.
*G01B 9/02*     (2006.01)
(52) U.S. Cl. ...................................... 356/478
(58) Field of Classification Search ............... 356/35.5, 356/478, 484, 47.7, 480, 519
See application file for complete search history.

(56) References Cited

U.S. PATENT DOCUMENTS

| | | | |
|---|---|---|---|
| 3,149,492 | A | 9/1964 | Weinberg |
| 3,851,521 | A | 12/1974 | Ottenstein |
| 4,080,837 | A | 3/1978 | Alexander et al. |
| 4,114,439 | A | 9/1978 | Fick |
| 4,144,768 | A | 3/1979 | Andersson et al. |
| 4,159,646 | A | 7/1979 | Paulsen et al. |
| 4,164,865 | A | 8/1979 | Hall et al. |
| 4,236,406 | A | 12/1980 | Reed et al. |
| 4,275,602 | A | 6/1981 | Fujishiro et al. |
| 4,445,389 | A | 5/1984 | Potzick et al. |
| 4,499,418 | A | 2/1985 | Helms et al. |
| 4,515,473 | A | 5/1985 | Mermelstein |
| 4,520,320 | A | 5/1985 | Potzick et al. |
| 4,546,649 | A | 10/1985 | Kantor |
| 4,706,501 | A | 11/1987 | Atkinson et al. |
| 4,788,852 | A | 12/1988 | Martin et al. |
| 4,813,270 | A | 3/1989 | Baillie |
| 4,862,750 | A | 9/1989 | Nice |

(Continued)

FOREIGN PATENT DOCUMENTS

GB     2 250 593     6/1992

(Continued)

OTHER PUBLICATIONS

Leo L. Beranek and Istvan L. Ver, "Noise and Vibration Control Engineering, Principles and Applications", 1992, pp. 537-541.

(Continued)

*Primary Examiner*—Hwa S Lee
(74) *Attorney, Agent, or Firm*—Patterson & Sheridan, LLP

(57) ABSTRACT

A method for interrogating time-multiplexed interferometric sensors using multiple interrogation pulses so as to increases the allowable interrogation pulse duty-cycle and improve the signal-to-noise ratio. In each TDM repetition period a sequence of multiple interrogation pulses are generated. The pulses in the sequence are separated by a time that is equal to the sensor imbalance. The phase from pulse to pulse in each TDM time-slot is modulated at a different, linear rate such that the pulse in time-slot m will have an optical frequency that is shifted by $m\Delta v$, where $\Delta v$ is the sub-carrier frequency. Because multiple reflections do not need to fade out the inventive method can enhance the signal-to-noise ratio of interferometric sensors such as inline Fabry-Perot sensors.

10 Claims, 4 Drawing Sheets

U.S. PATENT DOCUMENTS

| | | |
|---|---|---|
| 4,864,868 A | 9/1989 | Khalifa |
| 4,884,457 A | 12/1989 | Hatton |
| 4,896,540 A | 1/1990 | Shakkottai et al. |
| 4,932,262 A | 6/1990 | Wlodarczyk |
| 4,947,127 A | 8/1990 | Helms et al. |
| 4,950,883 A | 8/1990 | Glenn |
| 4,976,151 A | 12/1990 | Morishita |
| 4,996,419 A | 2/1991 | Morey |
| 5,024,099 A | 6/1991 | Lee |
| 5,031,460 A | 7/1991 | Kanenobu et al. |
| 5,040,415 A | 8/1991 | Barkhoudarian |
| 5,051,922 A | 9/1991 | Toral |
| 5,058,437 A | 10/1991 | Chaumont et al. |
| 5,083,452 A | 1/1992 | Hope |
| 5,099,697 A | 3/1992 | Agar |
| 5,115,670 A | 5/1992 | Shen |
| 5,152,181 A | 10/1992 | Lew |
| 5,207,107 A | 5/1993 | Wolf et al. |
| 5,218,197 A | 6/1993 | Carroll |
| 5,317,576 A | 5/1994 | Leonberger et al. |
| 5,321,991 A | 6/1994 | Kalotay |
| 5,347,873 A | 9/1994 | Vander Hayden |
| 5,361,130 A | 11/1994 | Kersey et al. |
| 5,363,342 A | 11/1994 | Layton et al. |
| 5,367,911 A | 11/1994 | Jewell et al. |
| 5,372,046 A | 12/1994 | Kleven et al. |
| 5,398,542 A | 3/1995 | Vasbinder |
| 5,401,956 A | 3/1995 | Dunphy et al. |
| 5,401,959 A | 3/1995 | Berkcan |
| 5,426,297 A | 6/1995 | Dunphy et al. |
| 5,440,932 A | 8/1995 | Wareham |
| 5,493,390 A | 2/1996 | Varasi et al. |
| 5,493,512 A | 2/1996 | Peube et al. |
| 5,513,913 A | 5/1996 | Ball et al. |
| 5,564,832 A | 10/1996 | Ball et al. |
| 5,576,497 A | 11/1996 | Vignos et al. |
| 5,591,922 A | 1/1997 | Segeral et al. |
| 5,597,961 A | 1/1997 | Marrelli |
| 5,639,667 A | 6/1997 | Heslot et al. |
| 5,642,098 A | 6/1997 | Santa Maria et al. |
| 5,644,093 A | 7/1997 | Wright et al. |
| 5,654,551 A | 8/1997 | Watt et al. |
| 5,657,405 A | 8/1997 | Fujiwara |
| 5,670,720 A | 9/1997 | Clark et al. |
| 5,680,489 A | 10/1997 | Kersey |
| 5,689,540 A | 11/1997 | Stephenson et al. |
| 5,708,211 A | 1/1998 | Jepson et al. |
| 5,730,219 A | 3/1998 | Tubel et al. |
| 5,732,776 A | 3/1998 | Tubel et al. |
| 5,741,980 A | 4/1998 | Hill et al. |
| 5,754,293 A | 5/1998 | Farhadiroushan |
| 5,803,167 A | 9/1998 | Bussear et al. |
| 5,804,713 A | 9/1998 | Kluth |
| 5,808,779 A | 9/1998 | Weis |
| 5,842,347 A | 12/1998 | Kinder |
| 5,845,033 A | 12/1998 | Berthold et al. |
| 5,906,238 A | 5/1999 | Carmody et al. |
| 5,907,104 A | 5/1999 | Cage et al. |
| 5,908,990 A | 6/1999 | Cummings |
| 5,917,597 A | 6/1999 | Hall et al. |
| 5,925,821 A | 7/1999 | Bousquet |
| 5,925,879 A | 7/1999 | Hay |
| 5,939,643 A | 8/1999 | Oertel et al. |
| 5,956,132 A | 9/1999 | Donzier |
| 5,959,547 A | 9/1999 | Tubel et al. |
| 5,963,880 A | 10/1999 | Smith |
| 5,975,204 A | 11/1999 | Tubel et al. |
| 5,987,197 A | 11/1999 | Kersey |
| 5,991,026 A | 11/1999 | Kluth et al. |
| 5,992,519 A | 11/1999 | Ramakrishnan et al. |
| 5,996,690 A | 12/1999 | Shaw et al. |
| 6,002,985 A | 12/1999 | Stephenson |
| 6,003,383 A | 12/1999 | Zielinska et al. |
| 6,003,385 A | 12/1999 | De Vanssay et al. |
| 6,009,216 A | 12/1999 | Pruett et al. |
| 6,016,702 A | 1/2000 | Maron |
| 6,158,288 A | 12/2000 | Smith |
| 6,195,162 B1 | 2/2001 | Varnham et al. |
| 6,212,306 B1 | 4/2001 | Cooper et al. |
| 6,216,532 B1 | 4/2001 | Stephenson et al. |
| 6,233,374 B1 | 5/2001 | Ogle et al. |
| 6,279,660 B1 | 8/2001 | Hay |
| 6,285,806 B1 | 9/2001 | Kersey et al. |
| 6,354,147 B1 | 3/2002 | Gysling et al. |
| 6,450,037 B1 | 9/2002 | McGuinn et al. |
| 6,463,813 B1 | 10/2002 | Gysling |
| 6,466,706 B1 | 10/2002 | Go et al. |
| 6,536,291 B1 | 3/2003 | Gysling et al. |
| 6,601,458 B1 | 8/2003 | Gysling et al. |
| 6,691,584 B2 | 2/2004 | Gysling et al. |
| 6,782,150 B2 | 8/2004 | David et al. |
| 2001/0013934 A1 | 8/2001 | Varnham et al. |
| 2002/0129662 A1 | 9/2002 | Gysling et al. |
| 2003/0066359 A1 | 4/2003 | Gysling et al. |

FOREIGN PATENT DOCUMENTS

| | | |
|---|---|---|
| WO | WO 00/00793 | 6/2000 |
| WO | WO 00/00799 | 6/2000 |

OTHER PUBLICATIONS

A. P. Dowling and J. E. FFOWCS Williams, "Sound And Sources", 1983, pp. 224-229.

"Advances In Instrumentation and Control", Proceedings of the ISA 90 International Conference and Exhibit, New Orleans, Louisiana, Oct. 14-18, 1990, vol. 45, pp. 1889-1914.

Alan D. Kersey, Michael A. Davis, Heather, J. Patrick, Michel LeBlanc, K.P. Koo, *Member, IEEE*, C.G. Askins, M.A. Putnam, and E. Joseph Friebele, "Fiber Grating Sensors", *Journal of Lightwave Technology,* vol. 15, No. 8, Aug. 1997, pp. 1443-1463.

U.K. Search Report, Application No. GB0511247.9, dated Aug. 26, 2005.

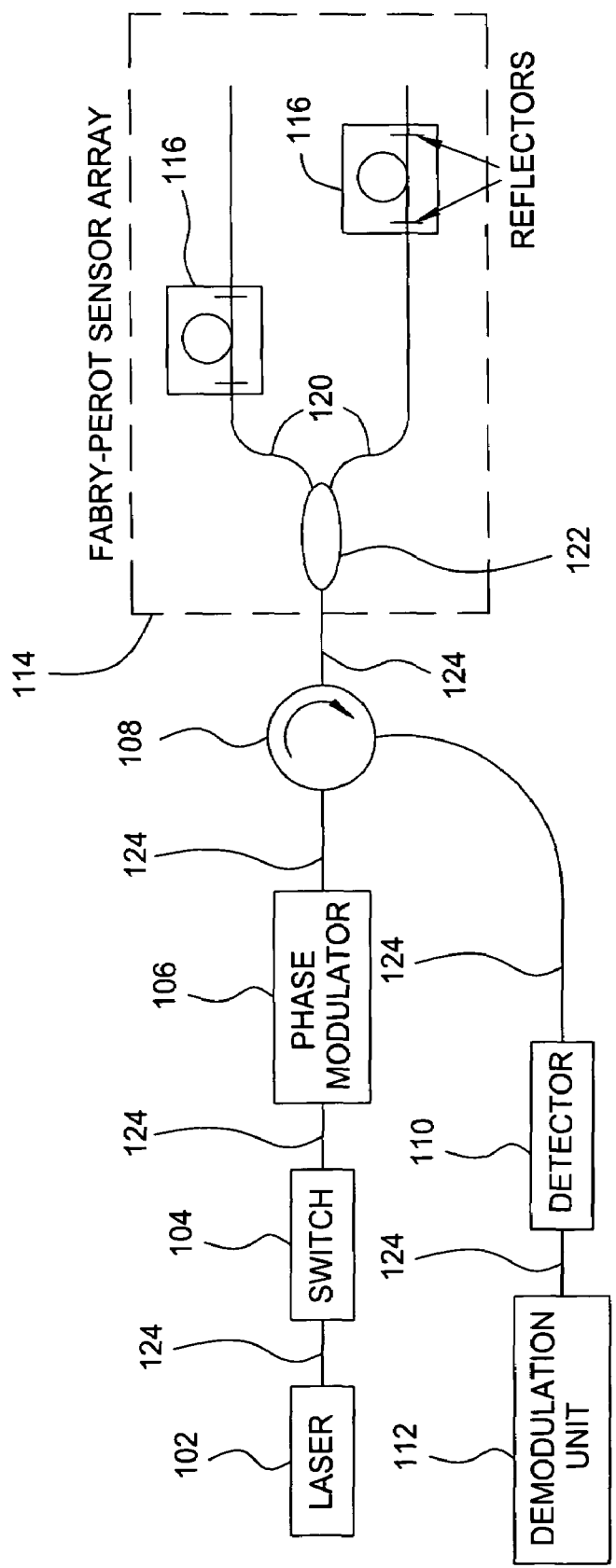
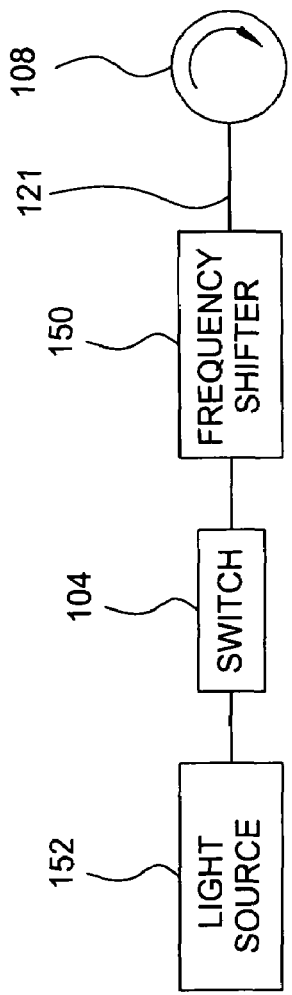
FIGURE 1
FIGURE 1A

MULTI-PULSE HETERODYNE SUB-CARRIER INTERROGATION OF INTERFEROMETRIC SENSORS

BACKGROUND OF THE INVENTION

1. Field of the Invention

The present invention generally relates to time division multiplexed interferometric sensors. More specifically, the present invention relates to interrogating interferometric sensors in a manner that increases the allowable interrogation pulse duty-cycle and that improves signal-to-noise ratios.

2. Description of the Related Art

Time division multiplexing (TDM) of interferometric sensors is performed using pulsed light sources to produce pulse reflections from the sensors such that the reflections are distributed in time because of the different time delays associated with each sensor. The requirement that the reflections from the different sensors be separated in the time domain results in the need to use pulse duty cycles and pulse repetition rates that take into account the number of sensors being sensed and their separations.

An interferometric sensor may be described as being comprised of two paths from an interrogating transmitter unit to a receiver unit through an optical sensor network. The optical sensor network may comprise a number of paths, where certain pairs of paths form sensor interferometers. The different paths through the sensor network may typically be formed by optical waveguides and splitters like optical fibers, optical splitters, circulators, and other waveguide coupled components, or free space optical paths, mirrors, beam splitters and other bulk components. The time delay difference between the two paths of a sensor is called the imbalance of that sensor. The sensor imbalance can be made sensitive to some measurand that one wants to measure. Changes in the sensor imbalance are measured by extracting the phase of the interference between light components that has propagated the two paths as they are combined in the receiver. The extracted phase will thus provide information about the desired measurand. The portions of the sensor network that are common to both the sensor path and the reference path of a sensor may be called transport or lead paths. In a fiber optic sensor network the lead paths are called lead fibers.

Interferometric sensors can be multiplexed along the same fiber using time-division multiplexing (TDM). In TDM, the optical source outputs light with a periodic intensity pattern and with a repetition period T called the TDM repetition period. The duty-cycle of the source is defined as the fraction of time in which the source is turned on. The duty-cycle depends on the number of multiplexed sensors and the separation between the sensors. Each sensor directs a portion of the source light to the receiver. The sensors form different delays from the source to the detector, and signals directed from different sensors will therefore be separated in time at the detector.

A well-known time division multiplexed interrogation technique is the two pulse heterodyne sub-carrier generation technique as disclosed in J. P. Dakin, "An Optical Sensing System," UK patent application number 2126820A (filed Jul. 17, 1982). The two pulse heterodyne technique repeatedly transmits two interrogation pulses that have pulse widths that are shorter than (or equal to) the sensor imbalance. The phase difference between the first and the second pulse of each pulse pair is linearly varied with time to produce a differential frequency shift between the sequences of first pulses and second pulses. In the two pulse heterodyne technique the second pulse that has propagated the shortest path of the interferometer and the first pulse that has propagated the longest path of the interferometer interfere, forming an interference pulse at the receiver which is detected and used for extraction of the sensor phase. The differential frequency shift between the first and second pulses of the pulse pairs produces a carrier frequency on the sequence of detected interference pulses. The phase of this carrier is extracted. This extracted carrier phase equals the sensor phase except for a constant phase term.

A well-known interrogation method for continuous wave (cw) interrogation of interferometric sensors is the phase generated carrier technique, disclosed in A. Dandrige et al., "Homodyne demodulation scheme for fiber optic sensors using phase generated carrier," IEEE Journal of Quantum Electronics, 18(10):1647-1653, 1982. The phase generated carrier technique is based on a harmonic bias modulation of the sensor phase, for instance by modulation of the source phase, resulting in a detected interference signal that has signal components at harmonics of the source modulation frequency. The sensor phase (without the applied bias modulation) can be determined from a combination of the signal components of several harmonics of the source modulation frequency. This technique can also be used in combination with time-division multiplexing, see A. D. Kersey et al. "Time-division multiplexing of interferometric fiber sensor using passive phase-generated carrier interrogation," Optics Letters, 12(10):775-777, 1987. The light source may then be pulsed in the same manner as for the two pulse heterodyne sub-carrier generation technique, while the source phase is modulated in the same manner as for the cw phase generated carrier technique. The detector is sampled at the arrival of the reflected pulses, and the sensor phase is calculated from the harmonics of the source modulation frequency.

One type of interferometric sensor is the inline Fabry-Perot sensor. When inline Fabry-Perot sensors are pulse interrogated, extra reflected pulses are received due to multiple reflections within the Fabry-Perot cavity. These pulses are called decay pulses. For Fabry-Perot interferometers, the number of decay pulses is in principle infinite. If for instance a decay pulse from sensor 1 arrives at the detector simultaneously with a detected interference pulse from sensor 2 that is used to calculate the sensor phase, the interference between the decay pulse and the detected interference pulse will introduce crosstalk from sensor 1 to sensor 2. Thus, the source duty-cycle and the delay separation between the sensors must be chosen so that the sequence of decay pulses has faded-out to a level that depends on the allowable crosstalk level. In the prior art, to suppress crosstalk between the inline Fabry-Perot sensors one set of decay pulses has to fade out before reflections from another pair of interrogation pulses can be received. Thus, most of the interrogation pulse duty-cycle is wasted by having to wait for the multiple reflections to fade. Other types of interferometric sensors have similar problems in that overlapping pulse reflections have to be prevented.

In view of the foregoing problems, an interferometric sensor interrogation method that increases the allowable interrogation pulse duty-cycle and that improves the signal-to-noise ratio would be beneficial.

SUMMARY OF THE INVENTION

Embodiments of the present invention generally provide for methods of interrogating time-multiplexed interferometric sensors using multiple interrogation pulses in a manner that increases the allowable interrogation pulse duty-cycle and that improves the signal-to-noise ratio.

According to embodiments of the present invention, in each TDM repetition period T, a sequence of $N_p>2$ multiple interrogation pulses are generated in $N_p$ transmission time slots, where subsequent transmission time slots are separated by a sensor imbalance $\tau_s$. Here the term "time-slot" refers to a period of time that occurs at the same position within every TDM repetition period. A phase modulator modulates the phase of the pulses such that the optical frequencies produced in different transmission time-slots are different. In a preferred embodiment, the difference in optical frequency between any two subsequent transmitted time-slots equals $\Delta v$, where $\Delta v$ is the sub-carrier frequency. The portion of the m'th ($m=0,1,\ldots,N_p-1$) interrogation pulse propagating the longest path of a sensor interferometer and the portion of the (m+1)'th interrogation pulse propagating the shortest path of the same interferometer will interfere, forming interference pulse number m out of a sequence of $N_p-1$ interference pulses that arrives at the receiver within each TDM repetition period. The interference pulse number m arrives in receiver time slot number m within every TDM repetition period. The sequence of detected interference pulses from receiver time slot m in sequence of TDM periods will contain a sub-carrier signal component with frequency $\Delta v$. This sub-carrier signal will have a phase that is equal to the phase of the sensor apart from a constant bias phase. The sensor phase is calculated by combining phase information from sub-carrier signals extracted from several or all of the receiver time slots.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a schematic illustration of a Fabry-Perot sensor array that incorporates the principles of the present invention;

FIG. 1A is a schematic illustration of using frequency modulation in a Fabry-Perot sensor array;

To facilitate understanding, identical reference numerals have been used, wherever possible, to designate identical elements that are common to the figures.

DETAILED DESCRIPTION OF THE PREFERRED EMBODIMENT

Figure 2:
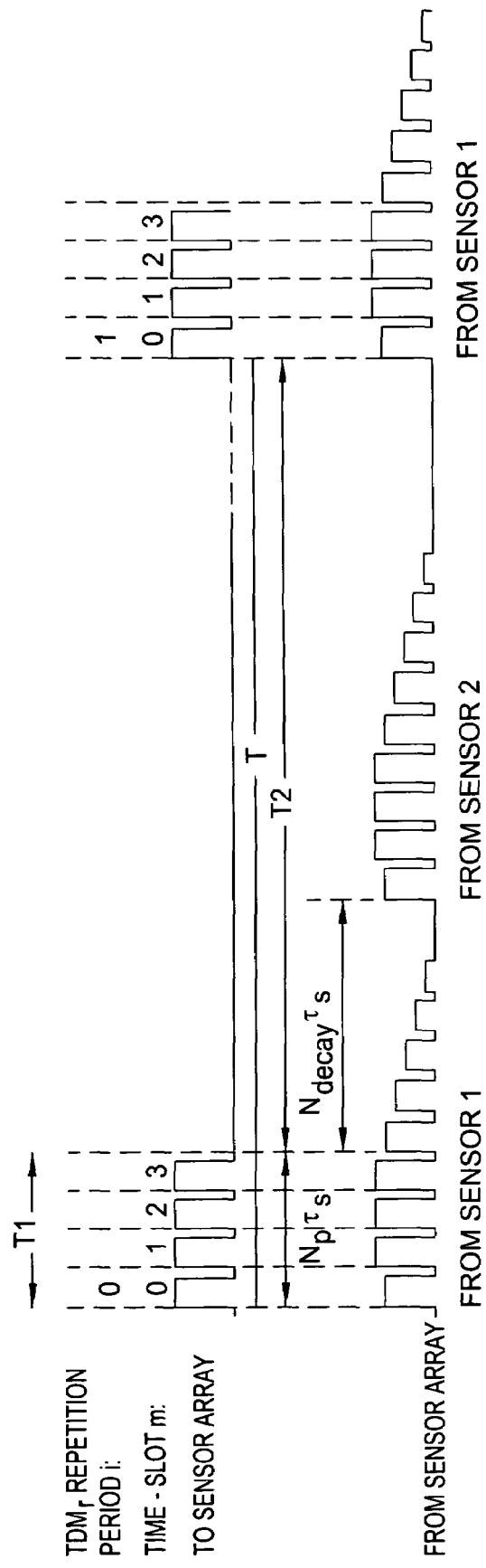
FIG. 2 depicts multiple optical pulses and TDM pulse periods used during interrogation of the Fabry-Perot sensor of FIG. 1.

The present invention provides for interrogating time-multiplexed interferometric sensors using multiple interrogation pulses in a manner that avoids the necessity of allowing all multiple reflections from a Fabry-Perrot interferometer to fade out at the receiver before reflections of a new interrogation pulse or signal sequence arrives at the receiver. Because the principles of the present invention enable interrogating time-multiplexed interferometric sensors without requiring time delays to fade out reflections of the interrogation pulses from prior interrogations, the inventive principles can enhance the signal-to-noise ratio of sensor measurements. The principles of the present invention represent an enhancement of the two pulse heterodyne sub-carrier technique in a manner such that the phase difference between any two subsequent pulses within one repetition period always changes by the same amount from one repetition period to the next.

FIG. 1 illustrates a fiber-optic interferometric measurement system 100 that incorporates the principles of the present invention. That system 100 includes a laser 102, a switch 104, a phase modulator 106, a circulator 108, a detector 110, and a demodulation unit 112. The measurement system 100 further includes an array 114 of Fabry-Perot sensors 116. The Fabry-Perot sensors 116 are individually formed on optical fibers 120 that are coupled together by a splitter 122 that is connected to the coupler 108. The individual elements are optically connected together by optical waveguides 124.

While FIG. 1 illustrates the use of a laser 102 and a phase modulator 106, the principles of the present invention can be implemented as shown in FIG. 1A. FIG. 1A shows a frequency shifter, such as a Bragg cell 150, which sweeps the frequency of the light from the laser 102. Additionally, while FIGS. 1 and 1A show a Fabry-Perot-based interferometric measurement system, the principles of the present invention are highly suited for other types of interferometric measurements.

FIG. 2 illustrates waveforms produced within the interferometric measurement system 100. Those waveforms include a period T that is comprised of a portion T1 having a sequence of $N_p$ laser pulses transmitted to the sensor array and a portion T2 that extends from the end of T1 to the start of the next period. FIG. 2 shows $N_p=4$ laser pulses in each period T1, with the start of the pulses is separated by the sensor imbalance duration $\tau_s$. Thus, the total pulsing time T1 is $N_p\tau_s$, while the non-pulsing time T2=T−T1. The periods (T1 and T2) repeat for subsequent interrogation periods.

The phase modulator 106 modulates the phase of the pulses such that the optical frequencies produced in different transmission time-slots are different. In a preferred embodiment, the difference in optical frequency between any two subsequent transmitted time-slots equals $\Delta v$, where $\Delta v$ is the sub-carrier frequency. These requirements are satisfied if the phase of the pulse output by the phase modulator in the $m^{th}$ transmission time-slot and $i^{th}$ TDM repetition period is given by, $$\phi(m,i)=\phi(0,i)+\phi(m,0)+2\pi\Delta v miT \quad (1)$$

By the term "time slot" we in general mean a period of time that occurs at a certain position within every TDM period. To generate the phase shift described by Eq. (1), assuming that the phase modulator has a linear response, the voltage that has to be applied to the phase modulator 106 is proportional to:

$$V_\phi(m,i) \propto \phi(m,0)+2\pi\Delta v miT \bmod 2\pi \quad (2)$$

The optical frequency of the pulses in time-slot m is given by $$v(m) = \frac{\phi(m,i) - \phi(m,(i-1))}{2\pi T} = v_0 + m\cdot\Delta v, \quad (3)$$

where $v_0$ is an optical frequency offset.

Thus, the pulses in two consecutive time slots are separated in frequency by $\Delta v$, so the phase function in Eq. (1) has a period equal to the sub-carrier period $1/\Delta v$. The foregoing phase function can alternatively be generated using a frequency shifter 150, such as a Bragg cell, which linearly sweeps over a frequency range equal to the free spectral range $1/\tau_s$ within one sub-carrier period $1/\Delta v$.

Figure 3:
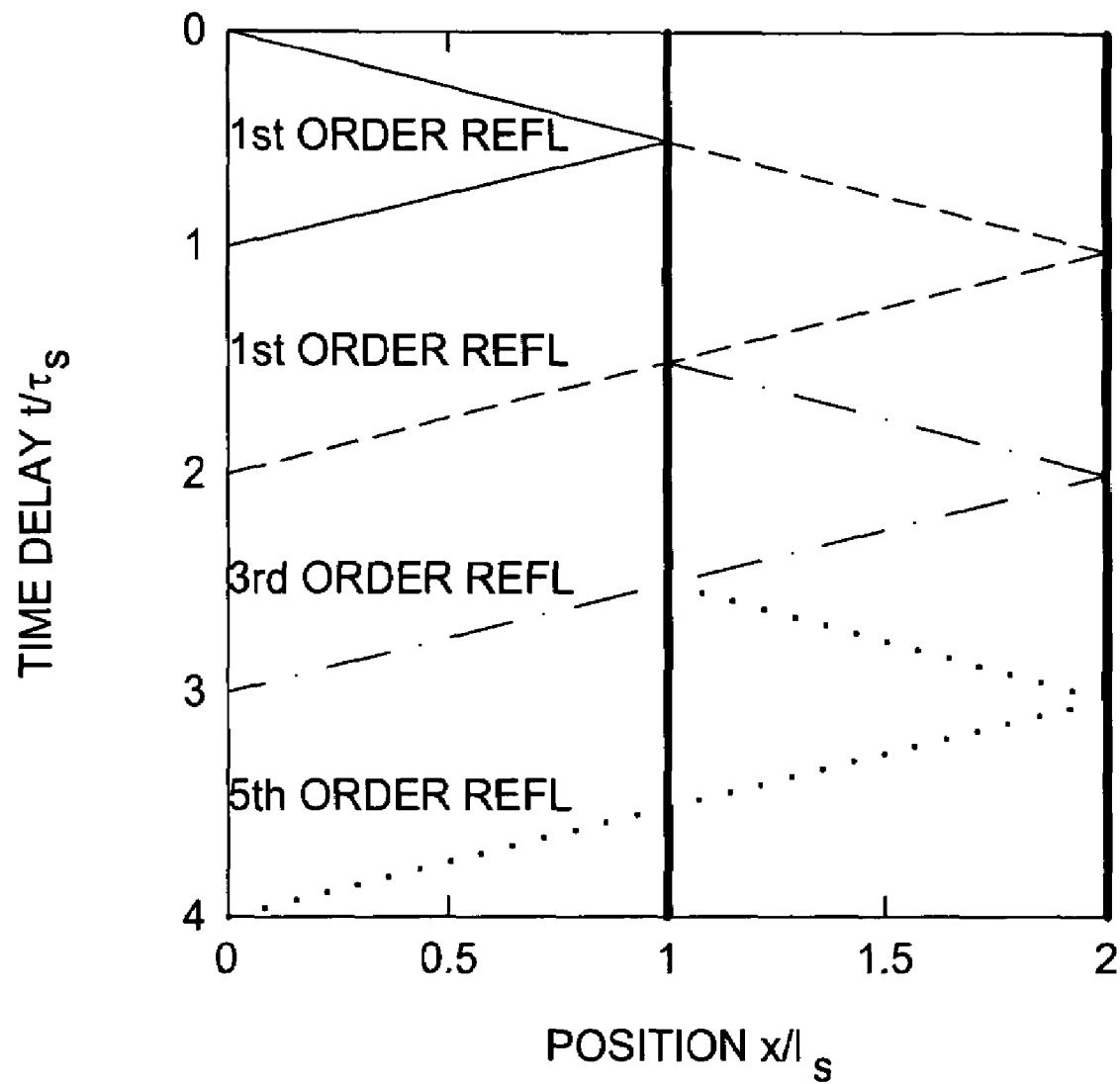
FIG. 3 illustrates the reflections of the multiple pulses illustrated in FIG. 2.

FIG. 3 illustrates pulse reflections within a Fabry-Perot sensor cavity that is interrogated using the principles of the present invention. For each round-trip traveled by an optical pulse within the Fabry-Perot sensor cavity, some portion of the light is reflected back towards the detector. The total reflected pulse sequence will be the sum of the pulse sequences reflected from each round trip. FIG. 3 specifically illustrates the leading edges of an interrogation pulse that is split into multiple pulse components. In FIG. 3, the thick vertical lines at positions 1 and 2 represent sensor reflector positions at integral distances $x/l_s$, where $l_s$ is the sensor length. The interrogation pulse enters the array at position 0 at time delay 0. As shown, pulse components returned from the array towards the left (at position 0) at different time delays have experienced a number of reflections that increases with the time delay. Therefore, the output pulses become weaker for increasing time delay.

Figure 4:
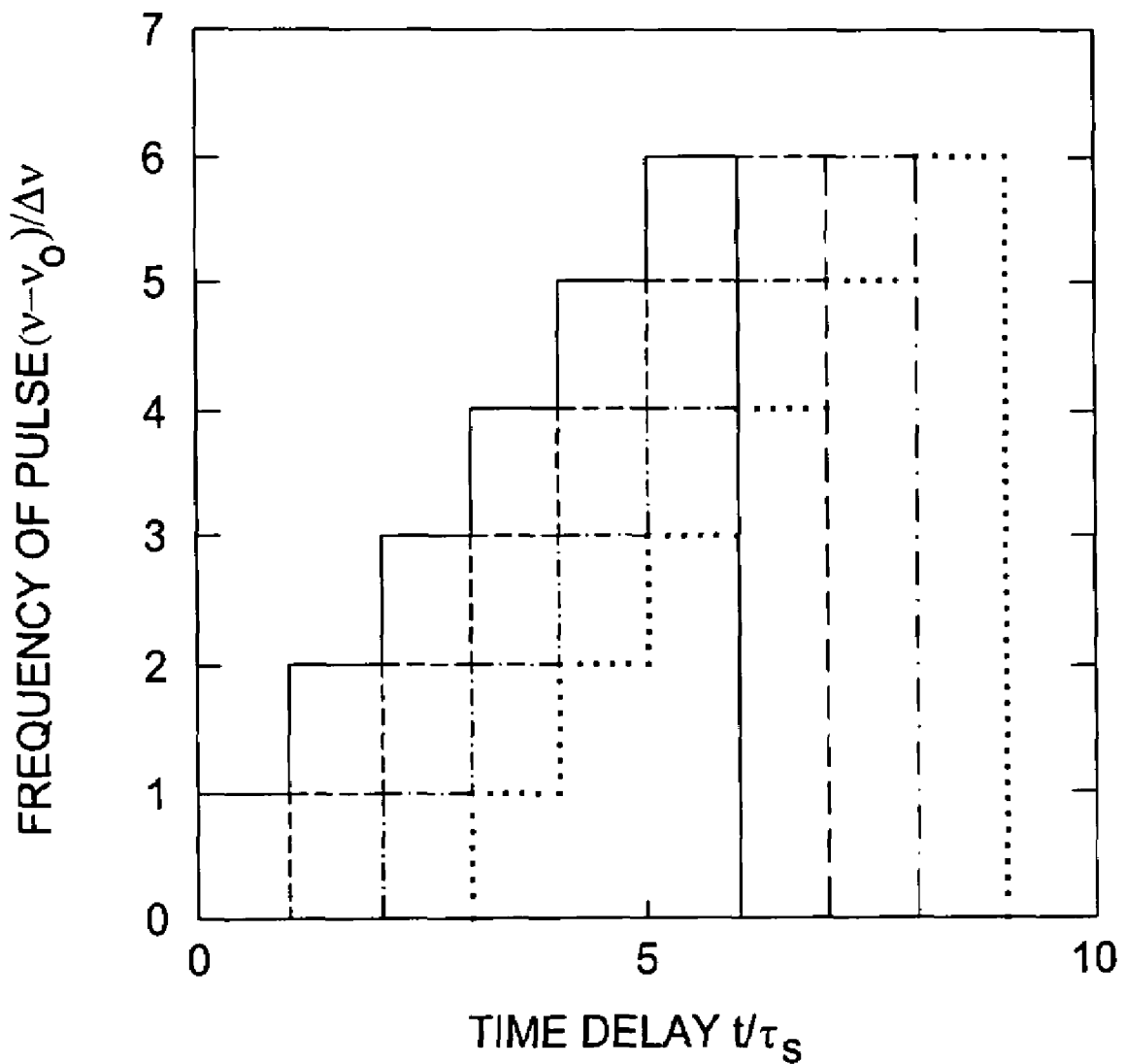
FIG. 4 is a graph of the frequency of the pulse reflections of FIG. 3 plotted against the time delay imposed on the multiple pulses depicted in FIG. 2.

FIG. 4 illustrates how the optical frequencies in different time-slots configure as they are reflected from the cavity. The 4 lines with different line styles correspond to the round-trips illustrated with the corresponding line style in FIG. 3. Pulses in any two time-slots that have a delay separation equal to the sensor imbalance $\tau_s$ have a frequency difference $\Delta v$.

In FIG. 3 the output pulses have different time delays. The interference between two pulses reflected from the array to the receiver with time-delay difference $j\tau_s(j=1,2,\ldots,N_p-1)$ has its intensity given by, $$l_j(m,i) \propto \cos(\phi(m,i) - \phi(m-j,i) + j\phi_s) = \cos(2\pi j \Delta v T i + j\phi_s). \quad (4)$$

Here, $m(m=j,\ldots,N_p-1)$ is the transmission time slot number and i is the TDM period number of the original source pulse. The total detected intensity of the interference pattern is denoted $l(m,i)$ and is the sum of all contributions $l_j(m,i)$, $j=1,2,\ldots,N_p-1$.

The foregoing shows that the sensor phase accumulates when the light passes multiple times through the cavity [as indicated by the term $j\phi_s$ in Eq. (4)]. If the components of the detected intensity signal that are due to interference between reflections with a time-delay difference other than $\tau_s$ are not removed, the demodulated signal will be distorted. Interference between the reflections with a difference in time-delay equal to the sensor delay imbalance $\tau_s$ will contribute to signal components at the sub-carrier frequency $\Delta v$ in the detected interference signal, while interference between reflections with time-delay differences equal to multiples of the sensor delay imbalance $\tau_s$ will only produce signal components at multiples of $\Delta v$. This allows for filtering away the unwanted contributions that would have given distortion of the signal. Only the band around $\Delta v$ is used to extract the sensor phase. The sensor phase can be found from:

$$\phi_s(k) = \arctan\left(\frac{X_s(k)}{X_c(k)}\right), \quad (5)$$

where $$X_s(k) = \sum_{i=kK}^{M-1+kK} \left(\sum_{m=1}^{N_p-1} I(m,i)\right) \sin(2\pi\Delta v i T) h(M+kK-i) \quad (6)$$

$$X_c(k) = \sum_{i=kK}^{M-1+kK} \left(\sum_{m=1}^{N_p-1} I(m,i)\right) \cos(2\pi\Delta v i T) h(M+kK-i)$$

Here, $l(m,i)$ is the detected intensity of the interference pulse in receiver time slot m and TDM period i. The inner summations in the expressions for $X_c$ and $X_s$ in Eq. (6) sums the $N_p-1$ pulses received within one TDM repetition period. These sums are mixed with cosine and sine terms at the sub-carrier frequency and convolved with a low-pass filter impulse response h of length M to extract the sine and cosine components of the inner sum signals at the sub-carrier frequency $X_s(k)$ and $X_c(k)$, respectively. The signals $X_s(k)$ and $X_c(k)$ thus contain one sample each per sub-carrier period. One sample of $\phi_s$ from each sub-carrier period is calculated by applying $X_s(k)$ and $X_c(k)$ to a four quadrant phase extraction (arctan) formula. $K=1/(\Delta v T)$ is the number of repetition periods per sub-carrier period. K should be an integer and $\Delta v$ and T should be chosen accordingly.

The largest possible frequency component that can be generated in the detected interference signal is $(N_p-1)\Delta v$. This frequency will occur if the impulse response of sensor network contains significant components that are separated in time by $(N_p-1)\tau_s$. In that case reflected components of the first pulse and the last pulse of the interrogation pulse sequence will overlap at the detector. Frequency components that are larger than $1/(2T)$ will be aliased to frequencies between 0 and $1/(2T)$, e.g. a frequency component at $1/(2T) < f < 1/T$ will be aliased to a frequency $1/T - f$. If a signal component is aliased to the frequency band around $\Delta v$, the extracted sensor phase will be distorted. Consequently, the largest possible frequency component that should be allowed to be generated with amplitudes that are high enough to cause unacceptable distortion is $1/T - 2\Delta v$. This implies that the maximum number of interrogating pulses $N_p$ in a sequence is determined by, $$f_{\max} = (N_p - 1)\Delta v = \frac{1}{T} - 2\Delta v \Leftrightarrow N_p = \frac{1}{T\Delta v} - 1 = K - 1 \quad (7)$$

The sensor phase is calculated from the $N_p-1$ reflected pulses from each repetition period that involves interference between first order reflections within the sensor cavity. However, there will be an infinite number of decay pulses that is produced by the multiple reflections within the Fabry-Perot cavity. The sequence of these pulses must be allowed to fade out to a level that is below the maximum allowable crosstalk level of the sensor array before a reflected pulse sequence from another sensor can be received. The number of the sequence of decay pulses that must be received before a new sequence of reflected pulses can be received, depends on the reflectivity of the reflectors.

With $N_{decay}$ decay pulses, the total length of the received pulse sequence is $N_p + N_{decay}$. With a total of N time multiplexed sensors, the minimum repetition period required is therefore, $$T = N(N_p + N_{decay})\tau_s \quad (8)$$

It can be shown that total reflected power is optimized when both Eqs. (7) and (8) are satisfied, while the distance between the sensors are selected such that $N_{decay}=N_p$, and the reflectivity is determined by the maximum allowable crosstalk level. Thus, the optimum number of interrogation pulses is:

$$N_{p,opt} = \frac{1}{2}\left(-1 + \sqrt{1 + \frac{2}{N\tau_s \cdot \Delta v}}\right) \quad (9)$$

The corresponding reflectivites becomes, $$R_{opt} = {}^{N_p-1}\sqrt{X_{rel}}, \quad (10)$$

where $X_{rel}$ is the maximum allowable crosstalk level. When compared to the two pulse interrogation method, the foregoing method has a potential of increasing the signal-to-noise ratio.

Crosstalk between sensors with moderate reflectivity may be relatively high when TDM multiplexing several Fabry-Perot sensors on the same line using any of the TDM interrogation methods discussed herein. Therefore, for some embodiments, couplers 122 that split the power into parallel optical waveguides 120 having one TDM sensor per fiber may be utilized. Further, for some embodiments, the interrogation techniques described herein may be combined with wavelength division multiplexing (WDM) by using gratings at different wavelengths as reflectors.

While the foregoing description is directed to embodiments of the present invention, other and further embodiments of the invention may be devised without departing from the basic scope thereof, and the scope thereof is determined by the claims that follow.

The invention claimed is:

1. A method of interrogating interferometric sensors, comprising:
    providing an optical network comprising multiple optical pathways from an optical transmitter to an optical receiver, where pairs of optical pathways form sensor interferometers, each sensor interferometer having a sensor imbalance;
    generating a time-division multiplexed signal with a repetition period;
    generating in each repetition period a sequence of interrogation pulses;
    generating the sequence of interrogation pulses in $N_p$ transmission time slots in each repetition period such that consecutive time slots have a separation that corresponds to the sensor imbalance, wherein $N_p$ is greater than 2; and
    modulating the interrogation pulses such that the interrogation pulses produced in different time-slots have different optical frequencies.

2. The method of claim 1, wherein the optical frequency generated in transmission time slot number m, where m ranges from 0 to $N_p-1$, is shifted by a frequency m $\Delta v$ relative to an optical frequency offset, where $\Delta v$ is the sub-carrier frequency of the interrogation pulses and the sub-carrier frequency is time dependent.

3. The method of claim 1, wherein the optical frequency produced in each transmission time-slot does not vary with time.

4. The method of claim 1, wherein modulating the sequence of $N_p$ interrogation pulses comprises frequency modulating light from a light source.

5. The method of claim 1, wherein modulating the sequence of $N_p$ interrogation pulses comprises phase modulating light from a light source.

6. The method of claim 1, wherein the optical network comprises an optical fiber.

7. The method of claim 6, wherein at least two sensor interferometers are formed in-line in the optical fiber.

8. The method of claim 1, wherein a receiver detects the intensities of pulses that are formed by interference between the portions of the interrogation pulses that have propagated the two pathways that form a sensor interferometer.

9. The method of claim 8, wherein the intensities of pulses are processed to extract information about a sensor phase.

10. The method of claim 8, wherein a time series of the intensities of pulses detected in different detection time slots are summed to generate a sum time series; and
    wherein the sum time series is applied to a phase extraction algorithm that extracts information about a phase of a signal component of the sum times series at the sub-carrier frequency $\Delta v$.

* * * * *